US012578950B2

(12) United States Patent
Jalal et al.

(10) Patent No.: US 12,578,950 B2
(45) Date of Patent: Mar. 17, 2026

(54) SERVICE ORCHESTRATION WITHIN A DISTRIBUTED POD BASED SYSTEM

(71) Applicant: Genentech, Inc., South San Francisco, CA (US)

(72) Inventors: Niaz Ahsan Jalal, South San Francisco, CA (US); Abdesslem Dridi, South San Francisco, CA (US)

(73) Assignee: Genentech, Inc., South San Francisco, CA (US)

( * ) Notice: Subject to any disclaimer, the term of this patent is extended or adjusted under 35 U.S.C. 154(b) by 168 days.

(21) Appl. No.: 18/312,565

(22) Filed: May 4, 2023

(65) Prior Publication Data

US 2023/0359455 A1 Nov. 9, 2023

Related U.S. Application Data

(63) Continuation of application No. PCT/US2021/058418, filed on Nov. 8, 2021.

(Continued)

(51) Int. Cl.
*G06F 8/65* (2018.01)
*G06F 9/50* (2006.01)

(52) U.S. Cl.
CPC .............. *G06F 8/65* (2013.01); *G06F 9/5077* (2013.01)

(58) Field of Classification Search
None
See application file for complete search history.

(56) References Cited

U.S. PATENT DOCUMENTS 11,153,184 B2 10/2021 Yadav et al.
12,155,731 B2 * 11/2024 Joshi ................... H04L 41/5096
(Continued)

FOREIGN PATENT DOCUMENTS

JP      2019-503535 A    2/2019
JP      2020-154861 A    9/2020
WO      2019169405 A1    9/2019

OTHER PUBLICATIONS

Dab et al., "An Efficient Traffic Steering for Cloud-Native Service Function Chaining", 23rd Conference on Innovation in Clouds, Internet and Networks and Workshops (ICIN), IEEE, 10.1109/ICIN48450.2020.9059340, Feb. 24, 2020, pp. 71-78.

(Continued)

*Primary Examiner* — Andrew M. Lyons
(74) *Attorney, Agent, or Firm* — Kilpatrick Townsend & Stockton LLP

(57) ABSTRACT

The present disclosure relates to techniques for service orchestration within a distributed pod based system. Particularly, aspects are directed to receiving, at a kernel residing on a distributed computing environment, a request to initiate deployment for a subservice or service on the distributed computing environment. The subservice or service has a type, and in order for the subservice or service to be deployed on the distributed computing environment, the type of the subservice or service has to be one that the distributed computing environment is configured to support. In response to receiving the request and the type of the subservice or service being one that the distributed computing environment is configured to support, specified resources are provisioned, and the subservice or service is deployed using a replica of a pod containing the provisioned specified resources and a modified image for the type of the subservice or service.

18 Claims, 5 Drawing Sheets

Related U.S. Application Data

(60) Provisional application No. 63/111,996, filed on Nov. 10, 2020.

(56) References Cited

U.S. PATENT DOCUMENTS

| | | | |
|---|---|---|---|
| 2006/0026042 A1 | 2/2006 | Awaraji et al. | |
| 2007/0106754 A1 | 5/2007 | Moore | |
| 2017/0103231 A1 | 4/2017 | Lipman | |
| 2018/0027079 A1* | 1/2018 | Ben Ali | H04L 67/141 |
| | | | 709/216 |
| 2018/0300116 A1 | 10/2018 | Meytin | |
| 2018/0359239 A1 | 12/2018 | Schwarz et al. | |
| 2019/0098037 A1 | 3/2019 | Shenoy, Jr. et al. | |
| 2019/0156023 A1* | 5/2019 | Gerebe | G06F 21/51 |
| 2020/0162380 A1 | 5/2020 | Pilkington et al. | |
| 2020/0195495 A1 | 6/2020 | Parker et al. | |
| 2020/0241867 A1* | 7/2020 | Gainsborough | G06F 8/63 |
| 2020/0280592 A1 | 9/2020 | Ithal et al. | |
| 2020/0412651 A1 | 12/2020 | Patidar et al. | |
| 2021/0034423 A1* | 2/2021 | Hallur | G06F 9/45558 |
| 2021/0311764 A1* | 10/2021 | Rosoff | G06F 9/44505 |
| 2022/0038544 A1 | 2/2022 | Grinstein et al. | |
| 2022/0244993 A1* | 8/2022 | MacDonald | H04L 12/40039 |

OTHER PUBLICATIONS

International Application No. PCT/US2021/058402 , "International Preliminary Report on Patentability", May 25, 2023, 9 pages.
International Application No. PCT/US2021/058402 , "International Search Report and Written Opinion", Mar. 2, 2022, 12 pages.
International Application No. PCT/US2021/058418 , "International Preliminary Report on Patentability", May 25, 2023, 12 pages.
International Application No. PCT/US2021/058418 , "International Search Report and Written Opinion", Feb. 11, 2022, 14 pages.
Ravula , "Achieving Continuous Delivery of Immutable Containerized Microservices with Mesos/Marathon", Aalto University, Thesis for the degree of Master of Science in Technology, May 19, 2017, pp. 1-84.
Li et al., "Service Mesh: Challenges, State of the Art, and Future Research Opportunities", IEEE International Conference on Service-Oriented System Engineering (SOSE), IEEE, Apr. 4, 2019, pp. 122-1225.
Takara, M.; "Kubernetes from Docker"; Sep. 30, 2019; 27 pages.

* cited by examiner

SERVICE ORCHESTRATION WITHIN A DISTRIBUTED POD BASED SYSTEM

PRIORITY CLAIM

This application is a continuation of International Application No. PCT/US2021/058418, filed on Nov. 8, 2021, which claims the benefit of and priority to U.S. Provisional Application No. 63/111,996, filed on Nov. 10, 2020, which is hereby incorporated by reference in its entirety for all purposes.

FIELD

The present disclosure relates to digital and personalized healthcare, and in particular to techniques for service orchestration within a distributed pod based system.

BACKGROUND

A cluster manager (also known as a kernel for a distributed computing system) provides resource sharing between multiple and different frameworks (e.g., stream processing, batch processing, data integration, storage frameworks, and the like). In some examples, the cluster manager includes: (i) agents for executing tasks from frameworks and notifies about available resources, (ii) frameworks for providing services or solving a specific use cases, and (iii) a master that mediates between the agents and frameworks. The frameworks include a scheduler that decides whether to accept or reject resources and an executor that assigns resources accepted to tasks and controls execution of the tasks. The resource sharing provided by the cluster manager generally includes resource allocation and resource isolation. The resource allocation involves the agents reporting available resources, the master deciding how many resources to offer each framework, and the frameworks deciding which resources to accept and which computations to run on the resources. The resource isolation involves the agents, master, and frameworks ensuring that resources allocated for any task will not be consumed by another task.

In healthcare, data-driven technology solutions are being developed to further personalized healthcare all while reducing costs. With the healthcare landscape shifting to an on-demand deployment system of personalized medical services and solutions, healthcare providers are looking to developers for help with innovating solutions faster through automating and streamlining the software deployment and service management processes. In order to support healthcare providers and services, developers have looked to distributed computing environments (e.g., cloud computing) as the healthcare information technology infrastructure standard, which is a low-cost way to develop the complex infrastructure required to support software deployment and service management processes within a service model (e.g., analytics-as-a-service (AaaS)). While distributed computing environments such as cloud computing afford healthcare providers many benefits, they function differently than legacy storage or information sharing solutions, and thus create their own unique privacy and security challenges. For example, because users access data through an internet connection, government regulation (e.g., Health Insurance Portability and Accountability Act (HIPAA), "good practice" quality guidelines and regulations (GxP), and General Data Protection Regulation (GDPR) compliance becomes a unique challenge for healthcare providers looking into cloud solutions to support software deployment and service management processes. Accordingly, there is a need for advances in compliant software deployment platforms, built to ensure the confidentiality, availability and integrity of protected healthcare information.

SUMMARY

In various embodiments, a computer-implemented method is provide that comprises: receiving, at a first kernel residing on a first distributed computing environment, a first request to initiate a deployment process for a first subservice or service on the first distributed computing environment, where the first subservice or service has a type, and in order for the first subservice or service to be deployed on the first distributed computing environment, the type of the first subservice or service has to be one that the first distributed computing environment is configured to support; in response to receiving the request and the type of the first subservice or service being one that the first distributed computing environment is configured to support, provisioning, by the first kernel, specified resources within a placement ring of the first distributed computing environment, where the provisioning comprises: obtaining an image based on the type of the first subservice or service, where the image is a template of a software package including a specification of resources used to execute the software package and the template is customized for using the specified resources based on the type of the first subservice or service; locating the specified resources within the placement ring; building, using the image, one or more containers encapsulating the specified resources, where the one or more containers are wrapped in a first pod for executing one or more programs to provide the first subservice or service; and modifying, using a writable layer, the image to include source code needed for executing the one or more programs; and deploying, by the first kernel, the first subservice or service using one or more replicas of the first pod and the modified image.

In some embodiments, the locating the resources comprises: parsing the image to identify the specified resources; requesting available resources from the placement ring; parsing the available resources from the placement ring; determining whether all of the specified resources from the image are available within the placement ring based on the parsing of the available resources; and responsive to all of the specified resources from the image being not available within the placement ring, autoscaling the available resources based on the image to provide the placement ring with additional resources to satisfy the specified resources identified from the image.

In some embodiments, obtaining the image further comprises identifying the image from a plurality of images based on the type of the first subservice or service; the image is configured in line with security best practices to reduce vulnerability of the image; and the security best practices are selected based on the type of the first subservice or service.

In some embodiments, the image is further configured in line with image specifications to optimize deployment workflow and performance; and the image specifications are selected based on the type of the first subservice or service.

In some embodiments, the type of the first subservice or service is a machine-learned model software, software as a medical device, software operating in conjunction with a physical medical device, or data ingestion and processing software.

In some embodiments, the method further comprises executing, by the kernel, the first subservice or service, where the executing comprises: determining, by a master of the kernel, a framework for executing the first subservice or service based on the type of the first subservice or service; offering, by the master of the kernel, available resources within the placement ring to the framework for executing the one or more programs to provide the first subservice or service; in response to the offer, receiving, by the master of kernel, information about tasks defined by the one or more programs; and sending, by the master of the kernel, the tasks to an agent of the kernel, which allocates the specified resources to an executor of the framework for executing the tasks.

In some embodiments, the method further comprises publishing, by the kernel, the first subservice or service; and initiating, by the kernel, security of the first subservice or service.

In some embodiments, the method further comprises: performing, by the kernel, a health check to assess functionality of the first subservice or service and determine whether the first subservice or service is functioning as expected; when the first subservice or service is fails the health check, notifying a continuous integration continuous deployment (CICD) system regarding the failure of the first subservice or service to function as expected, where the first request is received from the CICD system; and when the first subservice or service is functioning as expected, (i) publishing, by the kernel, the first subservice or service, (ii) initiating, by the kernel, the security of the first subservice or service, and (iii) notifying the CICD system regarding the success of the first subservice or service to function as expected.

In some embodiments, the method further comprises: receiving, at a second kernel residing on a second distributed computing environment, a second request to initiate a deployment process for a second subservice of the service on the second distributed computing environment, where the second subservice has a type, and in order for the second subservice or service to be deployed on the second distributed computing environment, the type of the second subservice or service has to be one that the second distributed computing environment is configured to support; in response to receiving the request, provisioning, by the second kernel, specified resources within a placement ring of the second distributed computing environment, where the provisioning comprises: obtaining an image based on the type of the second subservice or service, where the image is a template of a software package including a specification of resources used to execute the software package and the template is customized for using the specified resources based on the type of the second subservice or service; locating the specified resources within the placement ring; building, using the image, one or more containers encapsulating the specified resources, where the one or more containers are wrapped in a second pod for executing one or more programs to provide the second subservice or service; and modifying, using a writable layer, the image to include source code needed for executing the one or more programs; and deploying, by the second kernel, the second subservice or service using one or more replicas of the second pod and the modified image.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
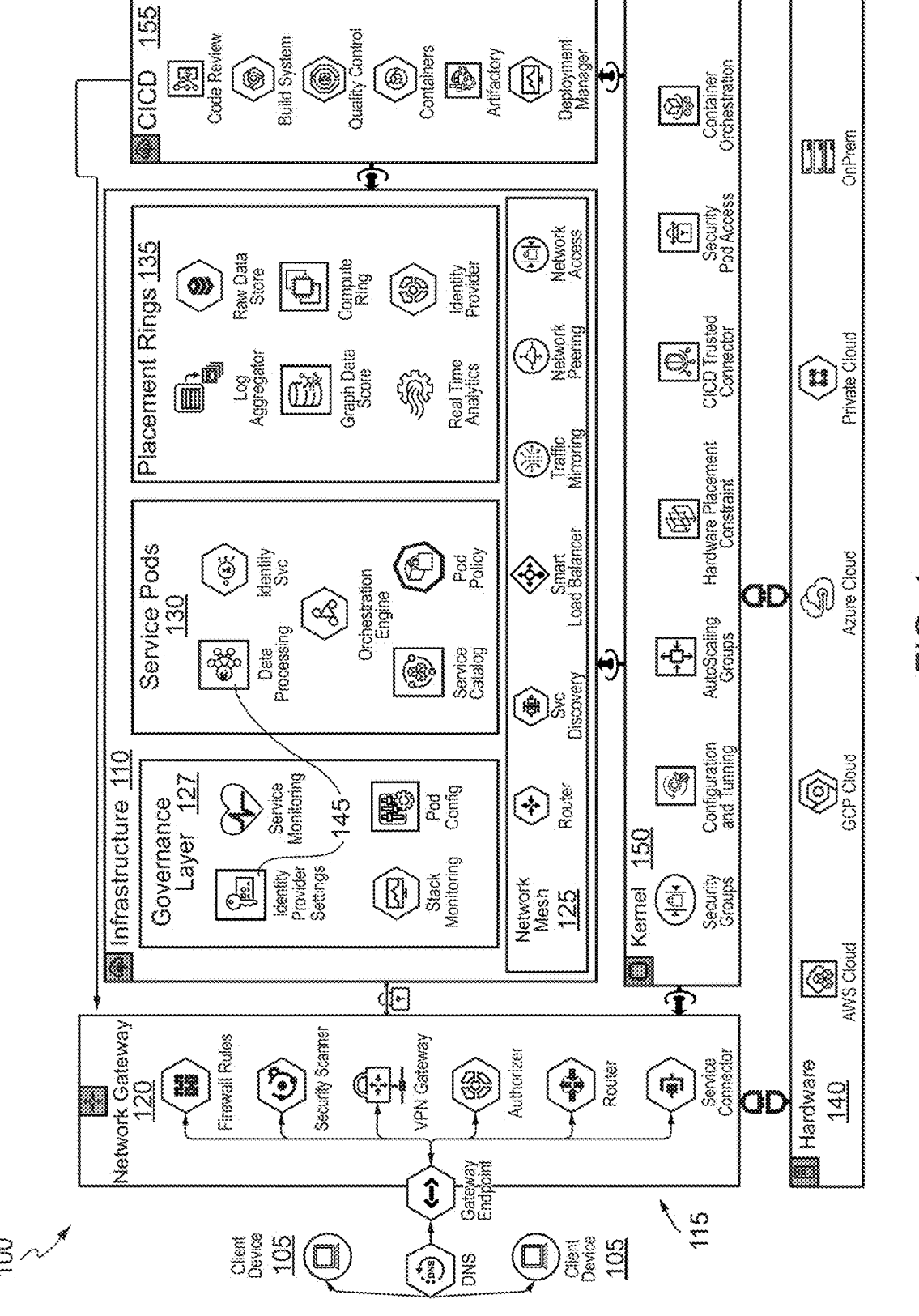
FIG. 1 depicts a diagram of a digital health platform for providing data-driven technology solutions according to various embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

The present disclosure describes techniques for service orchestration within a distributed pod based system. More specifically, embodiments of the present disclosure provide techniques for provisioning and deploying, by a cluster manager (referred to hereafter as a kernel), at least a portion of a service (referred to hereafter as a subservice) within a distributed pod based system based on a type of the subservice or the service.

A kernel provides resource allocation and isolation across applications or frameworks within a distributed computing environment (e.g., cloud computing). Cloud computing typically relies on virtualization, which includes provisioning cloud-based applications and services with virtual resources such as virtual machines. Efficient management of these resources is a challenge, as it has a direct impact on both the scalability and the operational costs of the distributed computing environment. One type of virtualization technology is containers, which provide portability of resources and require minimal overhead compared to traditional virtual machines. Traditional resource management strategies however are designed for the allocation and migration of virtual machines, so the challenge arises how these strategies can be adapted for the management of a containerized distributed computing environment. Apart from this, cloud computing solutions such as AaaS and Software as a Service (SaaS) are also no longer limited to a single distributed computing environment. In some instances, services are provisioned and deployed across multiple distributed computing environments (i.e., multi-cloud solutions that use multiple cloud providers and their provided computer hardware and physical network infrastructure to meet different technical or business requirements) that enables organizations to build a portable software stack that is DevOps driven, free from vendor lock-in and capable of delivering a superior set of capabilities than can be gained from a single distributed computing environment. Traditional resource management strategies however are designed for the allocation and migration of virtual machines within a single distributed computing environment, so the additional challenge arises how these strategies can be adapted for the management of multiple containerized distributed computing environments.

To address these limitations and problems, the techniques for service orchestration within a distributed pod based system in the present disclosure utilize a customized approach to resource allocation and isolation. This technique is intended to provision resources for a subservice or service to be deployed in a distributed computing environment. The subservice or service to be deployed has a type, and that to be deployed on a given distributed computing environment, the type of that subservice or service has to be one that the distributed computing environment is configured to support. The type of the subservice or service could be model software such as machine learned models, regression models, or any other kind of supervised or unsupervised model, machine-learned model software, software as a medical device (SAMD), software operating in conjunction with a physical medical device, or data ingestion and processing software. Moreover, the subservice or service is deployed using one or more containers wrapped into a pod. The one or more containers are configured using images obtained based on the type of that subservice or service to be deployed within the one or more containers. Each image is a binary that includes all of the requirements for running a single container, as well as metadata describing needs and capabilities of the container.

One illustrative embodiment of the present disclosure is directed to a method that includes receiving, at a first kernel residing on a first distributed computing environment, a first request to initiate a deployment process for a first subservice or service on the first distributed computing environment. The first subservice or service has a type, and in order for the first subservice or service to be deployed on the first distributed computing environment, the type of the first subservice or service has to be one that the first distributed computing environment is configured to support. The method further includes in response to receiving the request and the type of the first subservice or service being one that the first distributed computing environment is configured to support, provisioning, by the first kernel, specified resources within a placement ring of the first distributed computing environment. The provisioning comprises: obtaining an image based on the type of the first subservice or service, where the image is a template of a software package including a specification of resources used to execute the software package and the template is customized for using the specified resources based on the type of the first subservice or service, locating the specified resources within the placement ring; building, using the image, one or more containers encapsulating the specified resources, where the one or more containers are wrapped in a first pod for executing one or more programs to provide the first subservice or service; and modifying, using a writable layer, the image to include source code needed for executing the one or more programs. The method further includes deploying, by the first kernel, the first subservice or service using one or more replicas of the first pod and the modified image.

In some instances, the method further includes receiving, at a second kernel residing on a second distributed computing environment, a second request to initiate a deployment process for a second subservice of the service on the second distributed computing environment. The second subservice or service has a type, and in order for the second subservice or service to be deployed on the second distributed computing environment, the type of the second subservice or service has to be one that the second distributed computing environment is configured to support. The method further includes in response to receiving the request and the type of the second subservice or service being one that the second distributed computing environment is configured to support, provisioning, by the second kernel, specified resources within a placement ring of the second distributed computing environment. The provisioning comprises: obtaining an image based on the type of the second subservice or service, where the image is a template of a software package including a specification of resources used to execute the software package and the template is customized for using the specified resources based on the type of the second subservice or service, locating the specified resources within the placement ring; building, using the image, one or more containers encapsulating the specified resources, where the one or more containers are wrapped in a second pod for executing one or more programs to provide the second subservice or service; and modifying, using a writable layer, the image to include source code needed for executing the one or more programs. The method further includes deploying, by the second kernel, the second subservice or service using one or more replicas of the second pod and the modified image.

II. Digital Health Platform

FIG. 1 depicts a simplified diagram of a digital health platform 100 for providing data-driven technology solutions in accordance with various embodiments. In the illustrated embodiment, digital health platform 100 includes client computing devices 105 coupled to a cloud based infrastructure 110 via a network(s) 115 including network gateway 120 and network mesh 125. The infrastructure 110 is adapted to execute services or software applications within service pods 130 using resources provisioned within placement rings 135 by cloud service providers 140 (e.g., a distributed computing environment) using various hardware and cloud infrastructure (e.g., private cloud or on-premise cloud infrastructure and public cloud infrastructure). These services or software applications may be offered as web-based or cloud services, such as under an AaaS or SaaS model to users of client computing devices 105. Several providers offer cloud services such as Amazon, Google, and Oracle. The term cloud service is generally used to refer to a service that is made available to users on demand and via a communication network such as the Internet by systems (e.g., infrastructure 110) of a service provider such as a government regulated entity. Consumers may thus avail themselves of cloud services provided by a service provider without having to purchase separate licenses, support, or hardware and software resources that support the services. For example, a cloud service provider's system may host the one or more programs, and a user may, via the Internet, on demand, use the one or more programs without the user having to buy infrastructure resources for executing the one or more programs. Cloud services are designed to provide easy, scalable access to applications, resources and services.

In some instances, users (e.g., software or service consumers) operating client computing devices 105 utilize one or more client applications to consume the software products, services, or systems provided by various components 145 of the infrastructure 110. In other instances, users (e.g., developers) operating client computing devices 105 utilize one or more client applications to upload source code for the software products, services, or systems to be provided by the various components 145 of the infrastructure 110. The components 145 include software components that may be executed by one or more processors, hardware components, or combinations thereof. It should be appreciated that various different system configurations are possible, which may be different from those illustrated for the digital health platform 100. The embodiment shown in FIG. 1 is thus one example of a distributed computing environment for implementing a digital health platform and is not intended to be limiting.

The client computing devices 105 include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™ BlackBerry®, Palm OS®). Portable handheld devices may include cellular phones, smartphones, (e.g., an iPhone®), tablets (e.g., iPad®), personal digital assistants (PDAs), and the like. Wearable devices may include Fitbit Versa™ smart watch, virtual reality (VR) or augment reality (AR) systems such as magic leap 1®, HTV Vive, and Oculus®, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices 105 may be capable of executing various different applications such as various Internet-related apps, communication applications (e.g., E-mail applications, short message service (SMS) applications) and may use various communication protocols.

Network(s) 115 are any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 115 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The network gateway 120 is a network node that forms a secure passage between two or more of the networks 115 operating in the same or different protocols. The network gateway 120 may provide network security using one or more of the following techniques: a firewall for monitoring incoming and outgoing network traffic, a virtual private network to provide private secure channels of communication, security scanning for identifying security flaws within the network(s), an access manager for authentication and authorization services, and the like. The network gateway 120 routes network traffic using a router and a service connecter that manages access to various software products, services, or systems (e.g., using a service subscription business model). The network mesh 125 is a local network topology in which the infrastructure 110 (e.g., bridges, switches, and other infrastructure devices) connect directly, dynamically and non-hierarchically to as many other nodes as possible and cooperate with one another to efficiently route data between devices and nodes. The network mesh 125 manages connections using one or more of the following techniques: load balancing, products, services, or systems discovery, network access, routing, and peering, traffic mirroring, and the like. The network(s) 115, network gateway 120, and network mesh 125 work in combination to manage all data that inflows or outflows from infrastructure 110.

The components 145 include one or more general purpose computers, specialized server computers (including, by way of example, PC (personal computer) servers, application specific servers, mid-range servers, mainframe computers, rack-mounted servers, etc.), server farms, server clusters, or any other appropriate arrangement and/or combination computers or systems that work individually or in combination to provide resources, data, services, or programs to client computing devices 105 over network(s) 115. The components 145 may further include one or more virtual machines running virtual operating systems, or other computing architectures involving virtualization such as one or more flexible pools of logical storage devices that can be virtualized to maintain virtual storage devices. In various embodiments, the components 145 are adapted to run one or more services or software applications that provide the functionality described in the present disclosure.

The components 145 also include one or more data repositories. These data repositories may be used to store data and other information in various embodiments. For example, one or more of the data repositories may be used to store information for providing data-driven technology solutions such as SAMD and store information for validation and deployment of source code to implement the data-driven technology solutions. The data repositories may reside in a variety of locations. For example, a data repository used by a component may be local to of the component or may be remote from the component and in communication with the component via a network-based or dedicated connection. Data repositories may be of different types. In certain embodiments, a data repository used by a component may be a database, for example, a centralized database, a distributed database, a NoSQL database, a relational database, or the like. One or more of these databases may be adapted to enable storage, update, and retrieval of data to and from the database in response to SQL-formatted commands. In certain embodiments, one or more of data repositories may also be used by applications to store application data. The data repositories used by applications may be of different types such as, for example, a key-value store repository, an object store repository, or a general storage repository supported by a file system.

The components 145 also include computing nodes adapted to run one or more programs such as services or software applications (e.g., the services or software applications offered as web-based or cloud services or the applications for implementing a continuous integration and continuous deployment (CI/CD) system) that provide the functionality described in the present disclosure. Each node is a representation of single machine optionally implemented within a cluster of nodes. The single machine may be a physical machine (e.g., a server in a datacenter) or a virtual machine hosted on a cloud provider such as Amazon Web Services™ (AWS) with a set of a set of CPU and RAM resources that can be utilized. In clusters, the nodes pool together their resources to form a more powerful machine. When the one or more programs are deployed onto the cluster, the cluster intelligently handles distributing work to the individual nodes. If any nodes are added or removed, the cluster can shift around work as necessary. It does not matter to the one or more programs, or the infrastructure 110, which individual machines are actually running the code.

The one or more programs deployed onto one or more clusters are packaged as containers. Containers are a widely accepted standard, and various images can be defined for deploying the one or more programs on the infrastructure 110. Containerization allows for the infrastructure 110 to create self-contained execution environments. Any program and all its dependencies can be bundled up into a single file and then shared on the infrastructure 110. Creating a container can be done programmatically, allowing for powerful fully automated CI/CD pipelines to be used for validating code and deployment of code on the infrastructure 110. The containers are wrapped into a higher-level structure known as the pod 130. Containers in the same pod 130 may share the same resources and local network. In some instances, containers can communicate with other containers in the same pod 130 as though they were on the same machine while maintaining a degree of isolation from others. The pods 130 are used as the unit of replication in the infrastructure 110. If programs or resources become overwhelmed with processing and a single pod 130 instance cannot carry the load, the infrastructure 110 may be configured to deploy new replicas of a pod 130 to the cluster as necessary. Even when not under heavy load, it may be beneficial to have multiple copies of a pod 130 running at any time in a production system to allow load balancing and failure resistance. The one or more instances of the pods 130 are provisioned on the cloud infrastructure system provided by the one or more cloud service providers 140.

The cloud infrastructure system provided by the one or more cloud service providers 140 include infrastructure resources that are utilized for facilitating the provision of the one or more instances of the pods 130 supporting various cloud services offered by infrastructure 110. To facilitate efficient utilization of these resources for provisioning the one or more instances of the pods 130, the resources may be bundled into sets of resources or resource modules (also referred to as "placement rings 135"). Each resource module or placement ring 135 may comprise a pre-integrated and optimized combination of resources of one or more types. In certain examples, different placement rings 135 may be pre-provisioned for different types of cloud services. For example, a first set of placement rings 135 may be provisioned for a SAMD service, a second set of placement rings 135, which may include a different combination of resources than placement rings 135 in the first set of placement rings 135, may be provisioned for data analytics service, and the like. For some cloud services, the resources allocated for provisioning the services may be shared between the services.

The digital health platform 100 further includes one or more kernels 150. The kernels 150 are adapted to run on each cloud infrastructure system (e.g., distributed computing environment) provided by the one or more cloud service providers 140. The kernels 150 are cluster managers that provide resource allocation and isolation across distributed applications or frameworks across the entire digital health platform 100. The kernels 150 provide the one or more programs with application programming interfaces (APIs) for orchestration of services and software including resource management and scheduling. The architecture of the kernels 150 includes agent nodes for running tasks, master nodes for sending task to the agent nodes, a zookeeper for elections and for looking up address of master nodes, and frameworks to co-ordinate with the master nodes to schedule tasks onto agent nodes.

The digital health platform 100 further includes a CI/CD system 155. The CI/CD system 155 is implemented within the cloud infrastructure system and allows the digital health platform 100 to frequently update, test, and deliver changes within source code for the software products, services, or systems. As discussed in detail herein, in healthcare, there are government regulations regarding the security of data (e.g., data integrity and data privacy) to which software must adhere. In the CI/CD system 155, these policy regulations can be included in the code, allowing compliance to be tracked, validated, and reconfigured automatically. In an example of SAMD, data storage locations, server access controls, and activity logging can be included in the source code, such that user data can be protected and managed throughout use of the software. Encryption and password-protected operations can additionally be included during continuous integration. During continuous delivery, security and monitoring tools can be used to track user activity and detect errors that could lead to a security threat.

The CI/CD system 155 may also be used for provisioning machine-learning models. Machine-learning models are initially trained using a dataset, but over time, the model may drift or the data may change, leading to a need for an updated machine-learning model. If the machine-learning model runs within a software application, code associated with the software application can include triggers for when the machine-learning model should be retrained. For example, the code may include instructions for the machine-learning model to be retrained at predefined time intervals, when new training data is available, or when the performance of the machine-learning model is determined to fall below a threshold. Additionally, software developers may explore variations in model architectures and hyperparameters in a testing environment based on monitoring the performance of the machine-learning model in a production environment or based on estimated improvements for model optimization. The CI/CD system 155 allows for easy building, testing, and deployment to a production environment when the machine-learning model is determined to meet performance requirements.

III. Kernel

Figure 2:
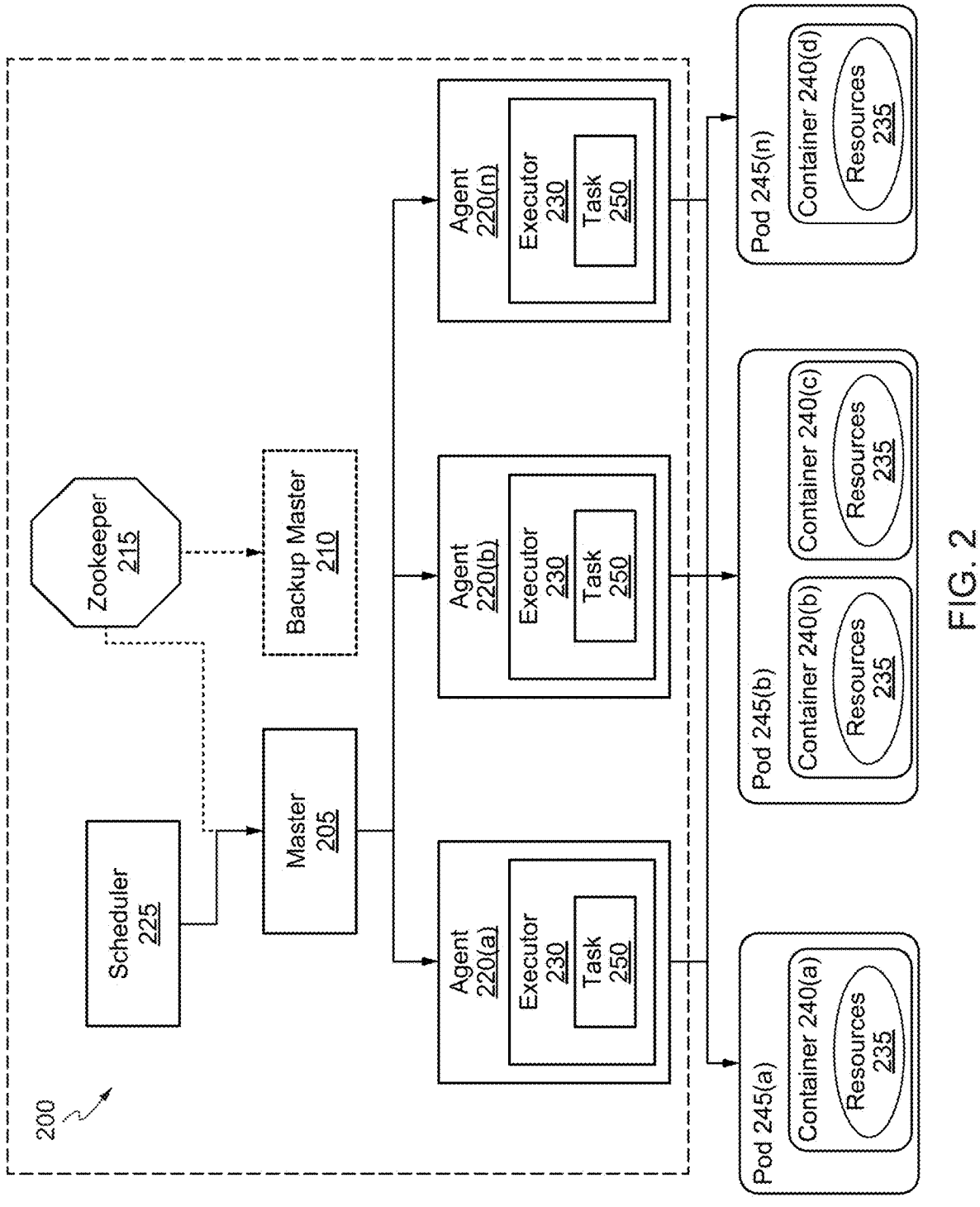
FIG. 2 depicts a diagram of a kernel according to various embodiments.

FIG. 2 depicts a simplified diagram of a kernel 200 (e.g., the kernels 150 described with respect to FIG. 1) for resource allocation and isolation across distributed applications or frameworks in accordance with various embodiments. In the illustrated embodiment, kernel 200 includes the software logic of a master 205, backup masters 210, a zookeeper 215, agents 220(a-n), and a framework comprising a scheduler 225 and executors 230. The kernel 200 groups together and provisions resources 235 within a container based environment based on a type of subservice or service to be deployed in a distributed computing environment. In particular, the type of the subservice or service has to be one that the distributed computing environment is configured to support. The type of the subservice or service could be model software such as machine learned models, regression models, or any other kind of supervised or unsupervised model, machine-learned model software, SAMD, software operating in conjunction with a physical medical device, or data ingestion and processing software. This restriction by type assists with efficient and effective management of the resources 235, and has a positive direct impact on both scalability and operational costs of the distributed computing environment. Using basic scripts or complex "orchestrators" a developer can quickly recover crashed subservice or service components, add new instances to meet increased demand, or perform rolling upgrades to update subservices or services without any downtime. Further, a container based environment can significantly decrease infrastructure costs because they are more lightweight than virtual machines and can share a single operating system.

The kernel 200 groups together resources 235 of the machines/nodes located in a cluster or placement ring into one or more containers 240(a-n) wrapped in a single pod instance 245(a-n), and from the single pod instances 245(a-n) a variety of tasks 250 for one or more programs may be executed utilizing the resources 235 in order to provide a subservice or service. The one or more containers 240(a-n) are configured using images obtained based on the type of that subservice or service to be deployed within the one or more containers. Each image is a binary that includes all of the requirements for running a single container, as well as metadata describing needs and capabilities of the container. The containers allow developers to create consistent and recreatable environments that are isolated from each other and can include dependencies. Although the isolation is not complete (e.g., authorized services may communicate with each other through API calls), the containers do isolate critical resources such as the container's access to the underlying CPU, memory, storage, and network resources between each container. This reduces the chances of individual containers consuming too many resources, and also prevents potential security issues.

The zookeeper 215 is a centralized configuration manager, used by the kernel 200 to coordinate activity across a cluster or placement ring. The zookeeper 215 is capable of electing a leading master 205, providing fault tolerance by electing backup masters 210 to replace a faulty leading master 205, and electing agents 220 to join a cluster or placement ring. The master 205 manages the agents 220 running on each cluster node and the frameworks that run tasks on the agents 220. The master 205 implements provisioning of specific resources within the cluster or placement ring and fine-grained sharing across frameworks using resource offers. Each resource offer is a list of available resources 235 available to multiple agents 220. The master 205 decides how many resources 235 to offer to each framework according to an organizational policy, such as fair sharing or priority. To support a diverse set of inter-framework allocation policies, the kernel 200 is adapted to allow users to define their own policies via a pluggable allocation module.

Each framework running on the kernel 200 is comprised of two components: the scheduler 225 that registers with the master 205 to be offered resources 235, and an executor 230 that is launched on agents 220 to run the framework's tasks 250. While the master 205 determines how many resources 235 to offer to each framework, the frameworks' schedulers 225 select which of the offered resources 235 to use. When a framework accepts offered resources 235, the framework passes a description to the master 205 of the tasks 250 defined by the one or more programs that the framework wants to execute on an agent 220. For example, a framework may schedule to run one or more tasks as follows. Initially, an agent 220 reports to the master that it has resources 235, e.g., 6 CPUs and 9 GB of free memory. The master 205 then invokes the allocation module, which tells the master 205 that a framework should be offered all available resources. Thereafter, the master 205 sends a resource offer describing all available resources 235 to the framework. The framework's scheduler 225 replies to the master 205 with information about tasks 250 defined by one or more programs, e.g., two tasks to run on the agent, using 3 CPUs; 1 GB RAM for the first task, and 2 CPUs; 6 GB RAM for the second task. Lastly, the master 205 sends the tasks 250 to the agent 220, which allocates appropriate resources 235 to the framework's executor 230 launches the two tasks. Because 1 CPU and 2 GB of RAM are still free, the allocation module may now offer them to another framework. In addition, this resource offer process repeats when tasks finish and new resources become available.

IV. Techniques for Deployment of a Service on a Digital Health Platform

Figure 3:
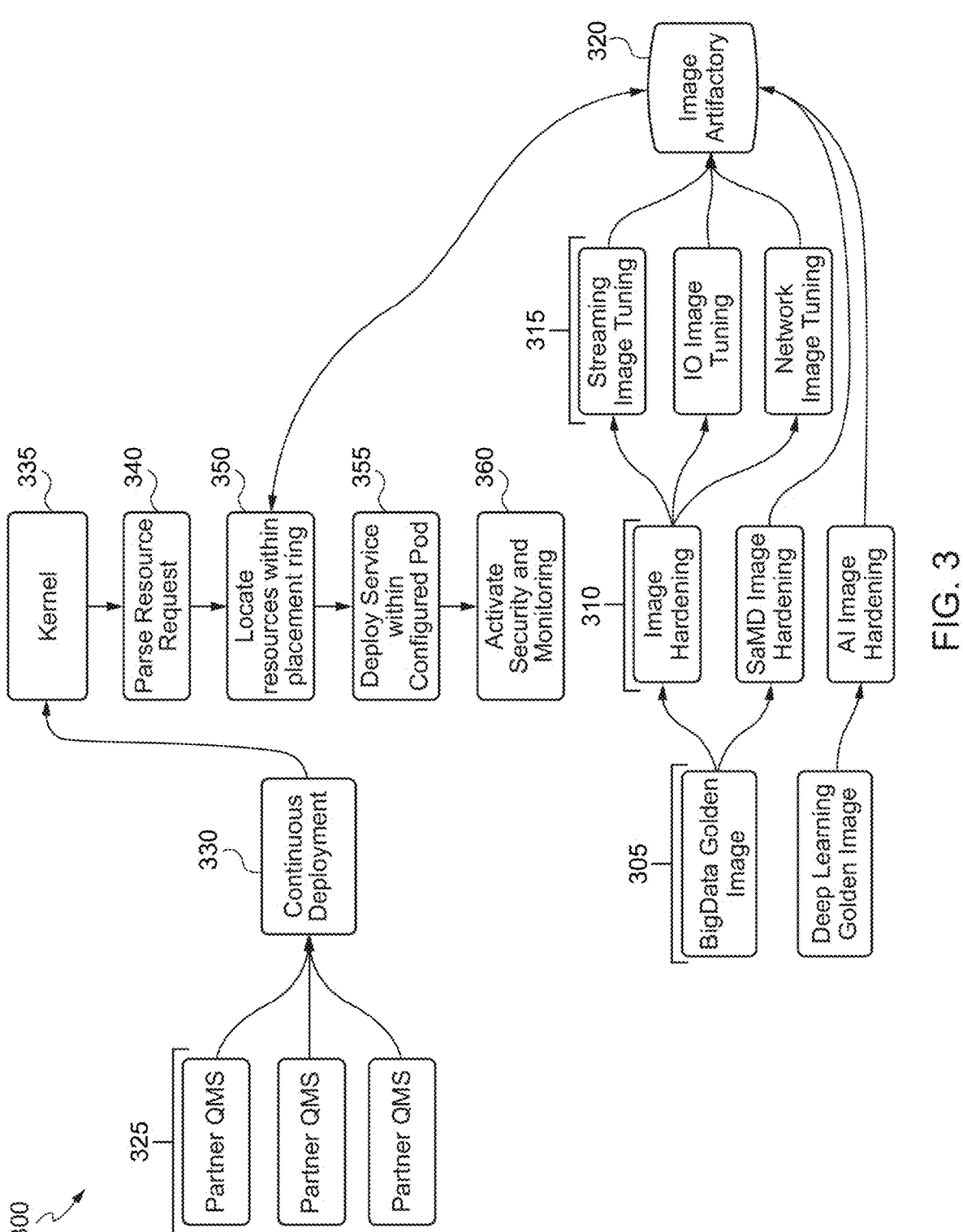
FIG. 3 depicts a block diagram of a process for service orchestration within a distributed pod based system according to various embodiments.
Figure 4:
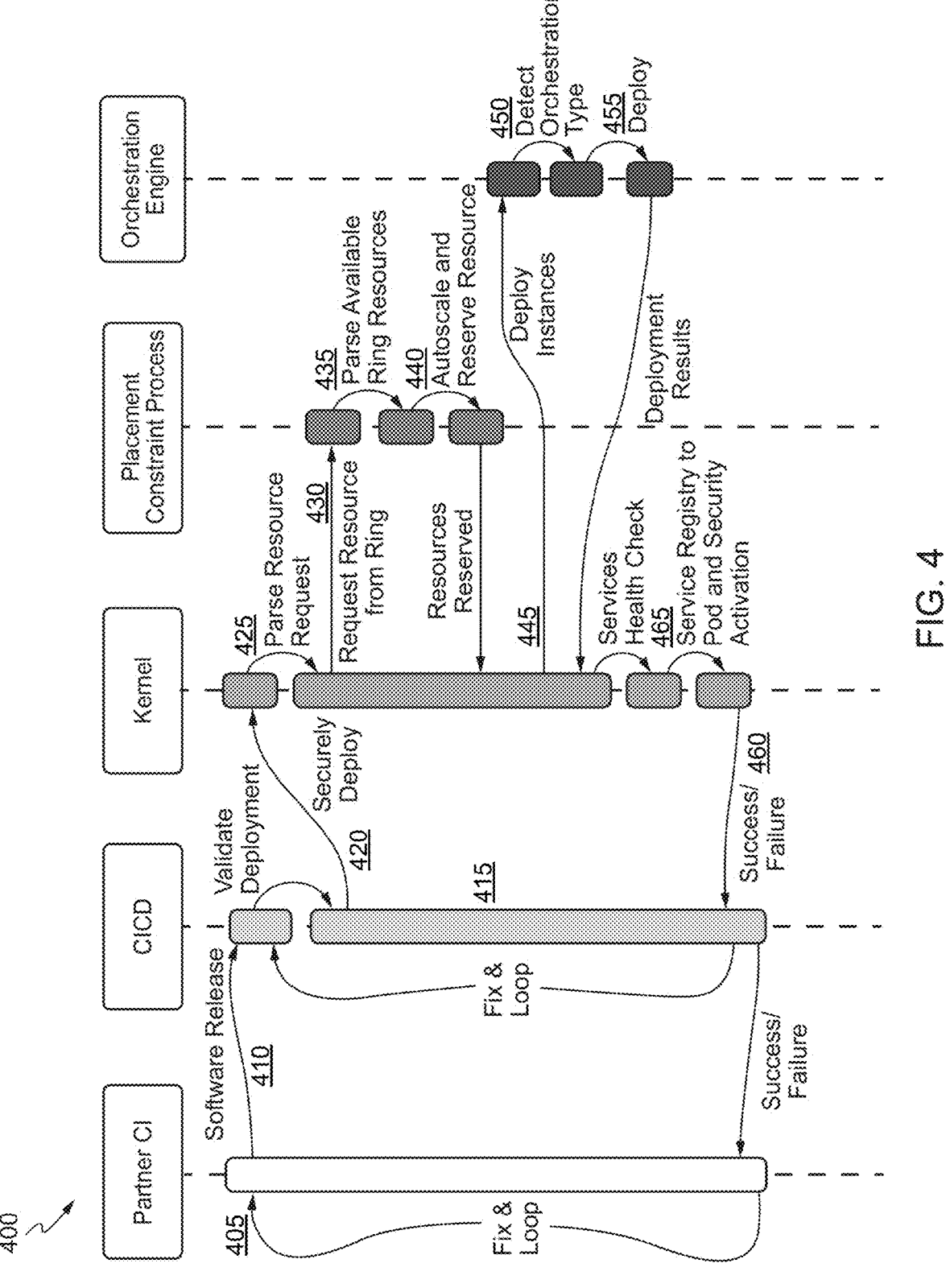
FIG. 4 depicts a swim lane diagram illustrating a process for using a kernel to deploy a subservice or service in a digital health platform according to various embodiments.
Figure 5:
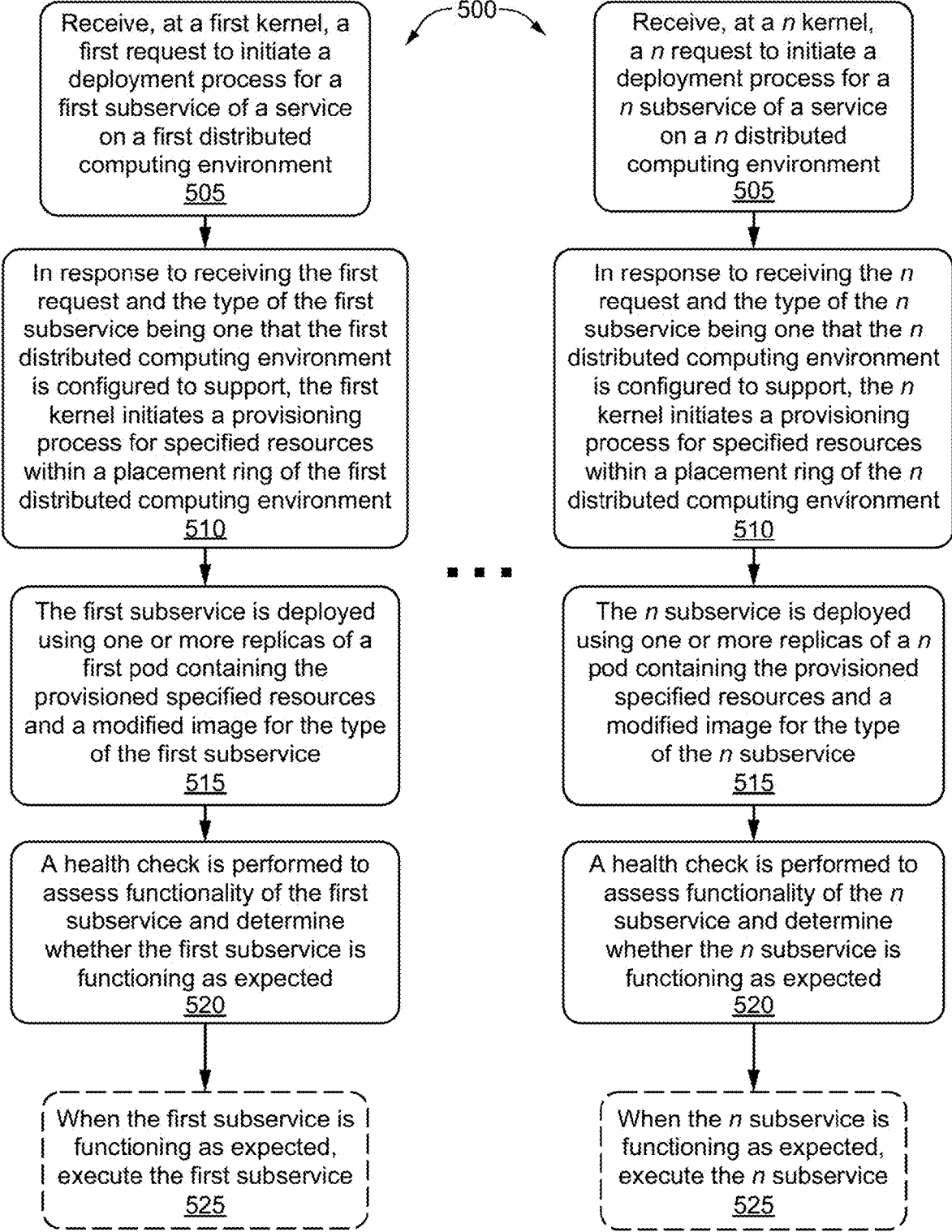
FIG. 5 depicts a flowchart illustrating a process for deploying one or more subservices of a service on a software platform according to various embodiments.

FIGS. 3-5 illustrate processes and operations for service orchestration within a distributed pod based system. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIGS. 3-5 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIGS. 3-5 is not intended to be limiting. Other sequences of steps may also be performed according to alternative embodiments. For example, in alternative embodiments the steps outlined above may be performed in a different order. Moreover, the individual steps illustrated in FIGS. 3-5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 3 is a high-level block diagram of a process 300 for service orchestration within a distributed pod based system in accordance with various aspects of the present disclosure. The processes depicted in diagram 300 are implemented by the architecture, systems, and techniques depicted in FIGS. 1 and 2.

At block 305, image templates are configured for various types of subservices or services to be deployed. The image templates are configured using a script of instructions that define how to build a specific image template. The script of instruction may be written based on service hardware requirements by a user such as an administrator of the software deployment service or a software developer that intends to deploy a given type subservice or service. The types of subservices or services include, but are not limited to, model software such as machine learned models, regression models, or any other kind of supervised or unsupervised model, SAMD, software operating in conjunction with a physical medical device, and data ingestion and processing software (e.g., stream processing, batch processing, long running services, data analytics and processing, data storage, and the like). Further, these categories are not mutually exclusive, for example a SAMD application may include machine learned models or aspects of data ingestion and processing. Each image template is a binary that includes all of the requirements for running a single container for a type of subservice or service, as well as metadata describing the needs and capabilities of a container. The template images are used to build containers for running the one or more programs to provide the type of subservice or service. Thus, each container is, essentially, a running image for the one or more programs. The image template on which a container is built however exists separately and cannot be altered. When a container is built with an image template, a read-write copy of the requirements for running the container (e.g., resources specified for a subservice or service) are created inside the container. Once the container is built, the container adds a writable layer on top of the immutable template image, meaning the template image can now be modified to include the source code, libraries, dependencies, tools, and other files needed for running the one or more programs to provide subservice or service. An unlimited number of images for running one or more programs can be created from a single image template.

At block 310, the image templates are hardened based on the type of subservice or service that the image template is configured for deployment. Hardening is the process of configuring an image in line with security best practices to reduce vulnerability of the image (e.g., strengthening a software package to reduce exposure surface and attack vectors using different tools and configurations). The security best practices are cloud service provider agnostic and independently configurable for the type of subservice or service that the image template is configured for deployment. For example, a first set of security best practices may be defined for hardening image templates configured for data analytics and processing. The first set of security best practices take into consideration weakness that are commonly seen with respect to data analytics and processing. Additionally, a second set of security best practices may be defined for hardening image templates configured for SAMD. The second set of security best practices take into consideration weakness that are commonly seen with respect to SAMD. Additionally, a third set of security best practices may be defined for hardening image templates configured for artificial intelligence or machine-learning processing. The third set of security best practices take into consideration weakness that are commonly seen with respect to artificial intelligence or machine-learning processing. Although only three types of hardening processes are illustrated in FIG. 3, it should be understood that multiple additional or alternative hardening processes may be available for hardening image templates including stream process hardening and batch process hardening.

At block 315, the hardened image templates are tuned based on the type of subservice or service that the image template is configured for deployment. Tuning is the process of configuring an image in line with image specifications to optimize deployment workflow and performance (e.g., improves the usage of a resource such as time to execute, memory usage, disk space usage, network usage . . . ). The image specifications are cloud service provider agnostic and independently configurable for the type of subservice or service that the image template is configured for deployment. For example, a first set of image specifications may be defined for tuning image templates configured for stream processing. The first set of image specifications take into consideration operations and issues that are commonly seen with respect to stream processing. Additionally, a second set of image specifications may be defined for tuning image templates configured for input/output processing. The second set of image specifications take into consideration operations and issues that are commonly seen with respect to input/output processing. Additionally, a third set of image specifications may be defined for tuning image templates configured for network processing. The third set of image specifications take into consideration operations and issues that are commonly seen with respect to network processing. Although only three types of tuning processes are illustrated in FIG. 3, it should be understood that multiple additional or alternative tuning processes may be available for tuning image templates including batch process tuning and long running service tuning.

At block 320, the image templates (hardened and/or tuned) are registered with a registry. The registry provides a service for storing and retrieving images in one or more repositories (i.e., an image artifactory). Each repository contains one or more image templates (hardened and/or tuned).

At block 325, actors release source code for verification, validation, and deployment to the CI/CD system of a software platform (e.g., a digital health platform 100 of a government regulated entity as described with respect to FIG. 1). In various instances (e.g., when an actor is a third party developer or partner), the source code has already been validated in accordance with a Quality Management System (QMS) associated with each actor. For example, each actor may establish a software life cycle model for validating their software that has been developed within the framework of a QMS that is appropriate for their product and organization. A QMS is a set of interrelated or interacting elements such as policies, objectives, procedures, processes, and resources that are established individually or collectively to guide an organization. For each of the software life cycle activities, there are tasks that can be performed that support a conclusion that the software is validated. However, the tasks to be performed, their order of performance, and the iteration and timing of their performance is dictated by the specific software life cycle model that is selected and the safety risk associated with the software application as perceived individually by the actor. Each task for validating the software typically starts with a requirement, for example, for each feature of the software, the actor should be able to point to a requirement that explains the function. Further, for each requirement, the actor should have a plan for testing that feature to make sure it is capable of functioning as required and a record keeping system for recording evidence that the plan was executed and results of the testing. Once the source code is verified and validated in accordance with the actor's QMS, the actor may release the source code to the CI/CD system for verification, validation, and deployment in accordance with the software platform's QMS.

At block 330, the CI/CD system of the software platform receives the source code and automatically performs quality and compliance checking of the source code and executable program in accordance with a QMS associated with the software platform. Thereafter, a determination is made as to whether the source code and executable program are valid and/or include vulnerabilities due to open source. If the source code and executable program are invalid (do not meet all or a portion of the requirements of the QMS) and/or the source code and executable program include vulnerabilities due to open source (as defined and determined by the software platform in accordance with the QMS), then the CI/CD system forwards the source code back to the actors to fix the failures and/or vulnerabilities of the source code. In contrast, if the source code and executable program are valid (meet all or a portion of the requirements of the QMS) and/or the source code and executable program do not include vulnerabilities due to open source (as defined and determined by the software platform in accordance with the QMS), then the CI/CD system notifies the kernel to initiate a deployment process for a subservice or service using the source code or software.

At block 335, the kernel (e.g., a kernel 200 as described with respect to FIG. 2) receives the request to initiate a deployment process for a subservice or service using the source code or software. The kernel is located on a distributed computing environment.

At block 340, the kernel parses the request to identify the type of the subservice or service to be deployed, and the source code, libraries, dependencies, tools, and other files needed for running one or more programs to provide the subservice or service. The type of subservice or service may include, but are not limited to, model software such as machine learned models, regression models, or any other kind of supervised or unsupervised model, SAMD, software operating in conjunction with a physical medical device, or data ingestion and processing software (e.g., stream processing, batch processing, long running services, data analytics and processing, data storage, and the like). In order for the subservice or service to be deployed on the distributed computing environment, the type of the subservice or service has to be one that the distributed computing environment is configured to support. The kernel checks the type of the subservice or service to be deployed against the types of the subservice or service supported by the distributed computing environment. If the type of that subservice or service is not one that the distributed computing environment is configured to support, then the kernel forwards the request to a different kernel on a different distributed computing environment that may be configured to support the type of that subservice or service. Accordingly, the distributed computing environment that the kernel ultimately identifies as being configured to support the type of that subservice or service may be the same or different from the distributed computing environment running the kernel that initially receives the request for the subservice or service.

At block 345, if the type of that subservice or service is one that the distributed computing environment is configured to support, then the kernel obtains an image for provisioning specified resources within a placement ring of the distributed computing environment. The image is obtained from the one or more repositories using the registry described with respect to block 320. The image is a template of a software package including a specification of resources used to execute the software package and the template is customized for using the resources based on the type of the first portion of the service to be deployed. For example, if a SAMD subservice is to be deployed then the kernel will retrieve an image template configured for SAMD processing.

At block 350, the kernel requests resources that are available within a placement ring. The available resources within a placement ring are parsed and a determination is made as to whether all of the specified resources from the image are available within the placement ring based on the parsing of the available resources.

At block 355, when all of the specified resources from the image are available within the placement ring, the kernel initiates a build and deploy process that uses the image to build one or more containers encapsulating the specified resources. When all of the specified resources from the image are not available within the placement ring, the kernel initiates an autoscale process to scale-up the available resources based on the image to provide the placement ring with additional resources to satisfy the specified resources identified from the image. Thereafter, the kernel initiates a build and deploy process that uses the image to build one or more containers encapsulating the available resources and the additional resources. Once the one or more containers are built, the one or more containers add a writable layer on top of the image, and modify the image to include the source code, libraries, dependencies, tools, and other files needed for executing the one or more programs to provide the subservice or service. The one or more containers are wrapped in a single pod instance for executing the one or more programs to provide the subservice or service. The subservice or service is deployed using one or more replicas of the single pod instance and the modified image.

At block 360, the subservice or service is published and security of the subservice or service is initiated. Security comprises: (i) authentication/authorization processes for identity and access management, and (ii) monitoring of authentication/authorization processes and use of the subservice or service for vulnerability concerns.

FIG. 4 illustrates a process 400 of using a kernel to deploy a subservice or service on a software platform. The processes depicted in flowchart 400 are implemented by the architecture, systems, and techniques depicted in FIGS. 1 and 2.

At step 405, the CI of the software development system retrieves source code for the deployment and executes a build process to build an executable program. As part of the build process, the CI of the software development system tests and validates the source code and executable program in accordance with QMS of the software development system. The QMS defines a set of requirements for validating the source code that is appropriate for the release manager's product and organization. For example, the set of requirements may be defined to determine whether the source code: conforms to an intended use, performs as intended to implement the intended use, and satisfies a base level of security. As an additional part of the build process, the CI of the software development system checks the quality of the source code. The code quality check includes checking for reliability (e.g., determining whether the code performs as intended with minimal defects), maintainability (e.g., follows a consistent structure/style, is easy to understand, is well documented, etc.), and testability (e.g., how well the software supports testing efforts for verification/ validation). Thereafter, a determination is made as to whether the source code and executable program are valid and/or are of sufficient quality. If the source code and executable program are invalid (do not meet all or a portion of the requirements of the QMS) and/or the source code and executable program are of poor quality (as defined and measured by the software development system in accordance with the QMS), then the CI of the software development system forwards the source code back to the development team to fix the failures and/or quality of the source code. In contrast, if the source code and executable program are valid (meet all or a portion of the requirements of the QMS) and/or the source code and executable program are of good quality (as defined and measured by the software development system in accordance with the QMS), then the CI of the software development system cuts a release of the source code to the software platform.

At step 410, the CI/CD system of the software platform receives the source code. In some instances, the entity controlling the CI/CD system is the same or different from that of the entity controlling the software development system.

At step 415, the CI/CD system executes a build process to build an executable program based on the received source code. As part of the build process, the CI/CD system tests and validates of the source code and executable program in accordance with QMS of the software platform. The QMS defines a set of requirements for validating the source code that is appropriate for the software platform. For example, the set of requirements may be defined to determine whether the source code: performs as intended to implement the intended use, satisfies an augmented level of security, satisfies requirements enforced by international, national, and/ or regional regulations, satisfies data privacy concerns, and satisfies performance requirements specific to the container and the software platform environment. As an additional part of the build process, the CI/CD system white sources the source code. The white sourcing includes: identifying the open source features of the source code, determining permissions or licenses associated with the open source features, and compiling the permissions or licenses and the associated open source features into a data structure. Thereafter, a determination is made as to whether the source code and executable program are valid and/or include vulnerabilities due to open source. If the source code and executable program are invalid (do not meet all or a portion of the requirements of the QMS) and/or the source code and executable program include vulnerabilities due to open source (as defined and determined by the software platform in accordance with the QMS), then the CI/CD system forwards the source code back to the development team to fix the failures and/or vulnerabilities of the source code. In contrast, if the source code and executable program are valid (meet all or a portion of the requirements of the QMS) and/or the source code and executable program do not include vulnerabilities due to open source (as defined and determined by the software platform in accordance with the QMS), then the CI/CD system proceeds with a deployment process for the source code or software.

At step 420, the kernel (e.g., a kernel 200 as described with respect to FIG. 2) receives a request to initiate a deployment process for a subservice or service using the source code or software. The kernel is located on a distributed computing environment (which is a part of the software platform).

At step 425, the kernel parses the request to identify the type of the subservice or service to be deployed, and the source code, libraries, dependencies, tools, and other files needed for running one or more programs to provide the subservice or service. The type of subservice or service may include, but are not limited to, model software such as machine learned models, regression models, or any other kind of supervised or unsupervised model, SAMD, software operating in conjunction with a physical medical device, or data ingestion and processing software (e.g., stream processing, batch processing, long running services, data analytics and processing, data storage, and the like). In order for the subservice or service to be deployed on the distributed computing environment, the type of the subservice or service has to be one that the distributed computing environment is configured to support. The kernel checks the type of the subservice or service to be deployed against the types of the subservice or service supported by the distributed computing environment. If the type of the subservice or service is not one that the distributed computing environment is configured to support, then the kernel forwards the request to a different kernel on a different distributed computing environment that may be configured to support the type of that subservice or service.

At step 430, if the type of the subservice or service is one that the distributed computing environment is configured to support, then the kernel requests available resources from a placement constraint process running over one or more placement rings within the distributed computing environment. Each placement ring may comprise a pre-integrated and optimized combination of resources of one or more types. In certain examples, different placement rings may be pre-provisioned for different types of cloud services. For example, a first set of placement rings may be provisioned for a SAMD service, a second set of placement rings, which may include a different combination of resources than placement rings in the first set of placement rings, may be provisioned for data analytics service, and the like.

At step 435, the placement constraint process parses available resources on the one or more placement rings within the distributed computing environment. The parsing is performed to obtain a list of all available resource on the one or more placement rings within the distributed computing environment.

At step 440, the placement constraint process makes a determination as to whether all of the specified resources from an image are available within the placement ring based on the parsing of the available resources. The image is obtained from an image artifactory (one or more repositories) based on the type of the subservice or service. The image is a template of a software package including a specification of resources used to execute the software package and the template is customized for using the specified resources based on the type of the subservice or service. When all of the specified resources from the image are available within the one or more placement rings, the placement constraint process, the placement constraint process reserves the specified resources and notifies the kernel that the specified resource are available and reserved. When all of the specified resources from the image are not available within the placement ring, the placement constraint process autoscales the available resources based on the image to provide the one or more placement rings with additional resources to satisfy the specified resources identified from the image. Thereafter, the placement constraint process reserves the specified resources and notifies the kernel that the specified resource are available and reserved.

At step 445, the kernel requests deployment of the subservice or service via an orchestration engine. The request includes information concerning the location of the specified resources within the one or more placement rings, the image associated with the type of subservice or service to be deployed, and the source code, libraries, dependencies, tools, and other files needed for running one or more programs to provide the subservice or service.

At step 450, the orchestration engine detects a type of orchestration to be performed for deployment of the subservice or service. The type of orchestration comprises identifying the type of orchestration from a plurality of types of orchestration based on the type of the subservice or service.

At step 455, the orchestration engine uses the image to build one or more containers encapsulating the specified resources based on the type of orchestration for deployment of the subservice or service. Once the one or more containers are built, the one or more containers add a writable layer on top of the image, and modify the image to include the source code, libraries, dependencies, tools, and other files needed for executing the one or more programs to provide the subservice or service. The one or more containers are wrapped in a single pod instance for executing the one or more programs to provide the subservice or service. The subservice or service is deployed using one or more replicas of the single pod instance and the modified image. Thereafter, the orchestration engine notifies the kernel as to whether the deployment of the subservice or service is a success or failure (and reasons thereof).

At step 460, when the deployment is a failure, the kernel notifies the CI/CD system such that remedial action may be taken. When the deployment is a success, the kernel performs a health check to assess functionality of the subservice or service and determine whether the subservice or service is functioning as expected. When the service is not functioning as expected, the kernel notifies the CI/CD system regarding the failure of the service to function as expected.

At step 465, when the service is functioning as expected, the kernel: (i) publishes the subservice or service (e.g., registers the subservice or service for use by one or more subscribers or users), (ii) initiates the security of the subservice or service, and (iii) notifies the CICD system regarding the success of the service to function as expected. Security comprises: (i) authentication/authorization processes for identity and access management, and (ii) monitoring of authentication/authorization processes and use of the subservice or service for vulnerability concerns.

FIG. 5 illustrates a process 500 for deploying one or more subservices of a service on a software platform. At step 505, a first request is received at a first kernel residing on a first distributed computing environment. The first request is to initiate a deployment process for a first subservice of the service on the first distributed computing environment. The first subservice has a type, and in order for the first subservice to be deployed on the first distributed computing environment, the type of the first subservice has to be one that the first distributed computing environment is configured to support. Configured to support meaning that the distributed computing environment offers compute power, memory storage, content delivery and other functionality to reliably run and scale the type of the subservice. In some instances, the type of the first subservice may include, but are not limited to, model software such as machine learned models, regression models, or any other kind of supervised or unsupervised models, software as a medical device, software operating in conjunction with a physical medical device, or data ingestion and processing software.

In order to ensure that the type of the first subservice is one that the first distributed computing environment is configured to support, the entity that sends the request (e.g., a CI/CD system) determines the type of the first subservice, determines types of subservices that a plurality of distributed computing environments are configured to support, selects a given distributed computing environment (e.g., the first distributed computing environment) configured to support the type of the first subservice, and sends the request to the given distributed computing environment (e.g., the first distributed computing environment). Alternatively, in order to ensure that the type of the first subservice is one that the first distributed computing environment is configured to support, the entity that sends the request (e.g., a CI/CD system) determines the type of the first subservice and sends the first request with the type of the first subservice. The first kernel checks the type of the first subservice to be deployed against the types of the subservices supported by the first distributed computing environment, and if the type of the first subservice is not one that the first distributed computing environment is configured to support, then the first kernel forwards the request to a different kernel on a different distributed computing environment that may be configured to support the type of first subservice. In contrast, if the type of the first subservice is one that the first distributed computing environment is configured to support, the process continues at step 510.

At step 510, in response to receiving the first request and the type of the first subservice being one that the first distributed computing environment is configured to support, the first kernel initiates a provisioning process for specified resources within a placement ring of the first distributed computing environment. The provisioning process comprises obtaining an image based on the type of the first subservice. The image is a template of a software package including a specification of resources used to execute the software package and the template is customized for using the specified resources based on the type of the first subservice. The obtaining the image comprises identifying the image from a plurality of images based on the type of the first subservice. The image is configured in line with security best practices to reduce vulnerability of the image, and the security best practices are selected based on the type of the first subservice. In some instances, the image is further configured in line with image specifications to optimize deployment workflow and performance, and the image specifications are selected based on the type of the first subservice.

The provisioning process further comprises locating the specified resources within the placement ring, which includes parsing the image to identify the specified resources, requesting available resources from the placement ring, parsing the available resources from the placement ring, and determining whether all of the specified resources from the image are available within the placement ring based on the parsing of the available resources. When all of the specified resources from the image are not available within the placement ring, autoscaling the available resources based on the image to provide the placement ring with additional resources to satisfy the specified resources identified from the image. When all of the specified resources from the image are available within the placement ring, reserving the specified resources.

The provisioning process further comprises building, using the image, one or more containers encapsulating the specified resources. The one or more containers are wrapped in a first pod for executing one or more programs to provide the first subservice. Once the one or more containers are built, the image is modified using a writable layer to include source code needed for executing the one or more programs. In certain instances, the image is modified to include the source code, libraries, dependencies, tools, and other files needed for executing the one or more programs s to provide the first subservice.

At step 515, the first subservice is deployed using one or more replicas of the first pod containing the provisioned specified resources and a modified image for the type of the first subservice. The first subservice is deployed on the first distributed computing environment.

At step 520, a health check is performed to assess functionality of the first subservice and determine whether the first subservice is functioning as expected. The first subservice is functioning as expected if the source code and executable program are valid (meet all or a portion of the requirements of a QMS), the source code and executable program do not include vulnerabilities due to open source (as defined and determined by the software platform in accordance with the QMS), and/or the first subservice passes the health check. When the first subservice is fails the health check, notifying a CICD system regarding the failure of the service to function as expected. When the first subservice is functioning as expected, (i) publishing the first subservice, (ii) initiating security of the first subservice, and (iii) notifying the CICD system regarding the success of the first subservice to function as expected.

Optionally at step 525, when the first subservice is functioning as expected, the first subservice may be offered for use and a user may initiate execution of the first subservice. The execution of the first subservice may comprise: (i) determining, by a master of the kernel, a framework for executing the first subservice based on the type of the first subservice or service; (ii) offering, by the master of the kernel, available resources within the placement ring to the framework for executing the one or more programs to provide the first subservice; in response to the offer, receiving, by the master of kernel, information about tasks defined by the one or more programs; and sending, by the master of the kernel, the tasks to an agent of the kernel, which allocates the specified resources to an executor of the framework for executing the tasks.

As further shown in FIG. 5, similar processes to those of steps 505-525 may be performed for a second, third, fourth, etc (n). subservice of the service in parallel, substantially in parallel, offset, or in sequence to one another and the processes performed for the first subservice. These process may be performed in order to deploy all of or a portion of the subservices associated with a service to be deployed on a software platform across multiple distributed computing environments, in accordance with aspects of the present disclosure.

V. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
   receiving, at a first kernel residing on a first distributed computing environment, a first request to initiate a deployment process for a first subservice or service on the first distributed computing environment, wherein the first subservice or service has a type, and in order for the first subservice or service to be deployed on the first distributed computing environment, the type of the first subservice or service has to be one that the first distributed computing environment is configured to support;
   in response to receiving the request and the type of the first subservice or service being one that the first distributed computing environment is configured to support, provisioning, by the first kernel, specified resources within a placement ring of the first distributed computing environment, wherein the placement ring comprises a pre-integrated and optimized combination of resources for the type of the first subservice or service, and wherein the provisioning comprises:

obtaining an image based on the type of the first subservice or service, wherein the image is a template of a software package including a specification of resources used to execute the software package and the template is customized for using the specified resources based on the type of the first subservice or service;

locating the specified resources within the placement ring;

building, using the image, one or more containers encapsulating the specified resources, wherein the one or more containers are wrapped in a first pod for executing one or more programs to provide the first subservice or service; and modifying, using a writable layer, the image to include source code needed for executing the one or more programs;

deploying, by the first kernel, the first subservice or service using one or more replicas of the first pod and the modified image; and executing, by the first kernel, the first subservice or service, wherein the executing comprises:

determining, by a master of the first kernel, a framework for executing the first subservice or service based on the type of the first subservice or service;

offering, by the master of the first kernel, available resources within the placement ring to the framework for executing the one or more programs to provide the first subservice or service;

in response to the offer, receiving, by the master of the first kernel, information about tasks defined by the one or more programs; and sending, by the master of the first kernel, the tasks to an agent of the first kernel, which allocates the specified resources to an executor of the framework for executing the tasks.

2. The computer-implemented method of claim 1, wherein the locating the resources comprises:

parsing the image to identify the specified resources;

requesting available resources from the placement ring;

parsing the available resources from the placement ring;

determining whether all of the specified resources from the image are available within the placement ring based on the parsing of the available resources; and responsive to all of the specified resources from the image being not available within the placement ring, autoscaling the available resources based on the image to provide the placement ring with additional resources to satisfy the specified resources identified from the image.

3. The computer-implemented method of claim 1, wherein the template is immutable, and wherein the modifying the image comprises adding the writable layer on top of the image.

4. The computer-implemented method of claim 1, wherein obtaining the image further comprises:

identifying the image from a plurality of images based on the type of the first subservice or service;

the image is configured in line with image specifications to optimize deployment workflow and performance and/or security best practices to reduce vulnerability of the image; and the image specifications are selected based on the type of the first subservice or service and/or the security best practices are selected based on the type of the first subservice or service.

5. The computer-implemented method of claim 1, wherein the type of the first subservice or service is a machine-learned model software, software as a medical device, software operating in conjunction with a physical medical device, or data ingestion and processing software.

6. The computer-implemented method of claim 1, further comprising:

publishing, by the first kernel, the first subservice or service; and initiating, by the first kernel, security of the first subservice or service.

7. The computer-implemented method of claim 1, further comprising:

receiving, at a second kernel residing on a second distributed computing environment, a second request to initiate a deployment process for a second subservice of the service on the second distributed computing environment, wherein the second subservice has a type, and in order for the second subservice or service to be deployed on the second distributed computing environment, the type of the second subservice or service has to be one that the second distributed computing environment is configured to support;

in response to receiving the request, provisioning, by the second kernel, specified resources within a placement ring of the second distributed computing environment, wherein the provisioning comprises:

obtaining an image based on the type of the second subservice or service, wherein the image is a template of a software package including a specification of resources used to execute the software package and the template is customized for using the specified resources based on the type of the second subservice or service;

locating the specified resources within the placement ring;

building, using the image, one or more containers encapsulating the specified resources, wherein the one or more containers are wrapped in a second pod for executing one or more programs to provide the second subservice or service; and modifying, using a writable layer, the image to include source code needed for executing the one or more programs; and deploying, by the second kernel, the second subservice or service using one or more replicas of the second pod and the modified image.

8. A computer-implemented method comprising:

receiving, at a kernel residing on a distributed computing environment, a request to initiate a deployment process for a subservice or service on the distributed computing environment, wherein the subservice or service has a type, and in order for the subservice or service to be deployed on the distributed computing environment, the type of the subservice or service has to be one that the distributed computing environment is configured to support;

in response to receiving the request and the type of the subservice or service being one that the distributed computing environment is configured to support, provisioning, by the kernel, specified resources within a placement ring of the distributed computing environment, wherein the provisioning comprises:

obtaining an image based on the type of the subservice or service, wherein the image is a template of a software package including a specification of resources used to execute the software package and the template is customized for using the specified resources based on the type of the subservice or service;

locating the specified resources within the placement ring;

building, using the image, one or more containers encapsulating the specified resources, wherein the one or more containers are wrapped in a pod for executing one or more programs to provide the subservice or service; and modifying, using a writable layer, the image to include source code needed for executing the one or more programs;

deploying, by the kernel, the subservice or service using one or more replicas of the pod and the modified image;

performing, by the kernel, a health check to assess functionality of the subservice or service and determine whether the subservice or service is functioning as expected;

when the subservice or service is fails the health check, notifying a continuous integration continuous deployment (CICD) system regarding the failure of the subservice or service to function as expected, wherein the request is received from the CICD system; and when the subservice or service is functioning as expected, (i) publishing, by the kernel, the subservice or service, (ii) initiating, by the kernel, the security of the subservice or service, and (iii) notifying the CICD system regarding the success of the subservice or service to function as expected.

9. A system comprising:

one or more data processors; and a non-transitory computer readable storage medium containing instructions which, when executed on the one or more data processors, cause the one or more data processors to perform actions including:

receiving, at a first kernel residing on a first distributed computing environment, a first request to initiate a deployment process for a first subservice or service on the first distributed computing environment, wherein the first subservice or service has a type, and in order for the first subservice or service to be deployed on the first distributed computing environment, the type of the first subservice or service has to be one that the first distributed computing environment is configured to support;

in response to receiving the request and the type of the first subservice or service being one that the first distributed computing environment is configured to support, provisioning, by the first kernel, specified resources within a placement ring of the first distributed computing environment, wherein the placement ring comprises a pre-integrated and optimized combination of resources for the type of the first subservice or service, and wherein the provisioning comprises:

obtaining an image based on the type of the first subservice or service, wherein the image is a template of a software package including a specification of resources used to execute the software package and the template is customized for using the specified resources based on the type of the first subservice or service;

locating the specified resources within the placement ring;

building, using the image, one or more containers encapsulating the specified resources, wherein the one or more containers are wrapped in a first pod for executing one or more programs to provide the first subservice or service; and modifying, using a writable layer, the image to include source code needed for executing the one or more programs;

deploying, by the first kernel, the first subservice or service using one or more replicas of the first pod and the modified image; and executing, by the first kernel, the first subservice or service, wherein the executing comprises:

determining, by a master of the first kernel, a framework for executing the first subservice or service based on the type of the first subservice or service;

offering, by the master of the first kernel, available resources within the placement ring to the framework for executing the one or more programs to provide the first subservice or service;

in response to the offer, receiving, by the master of the first kernel, information about tasks defined by the one or more programs; and sending, by the master of the first kernel, the tasks to an agent of the first kernel, which allocates the specified resources to an executor of the framework for executing the tasks.

10. The system of claim 9, wherein the locating the resources comprises:

parsing the image to identify the specified resources;

requesting available resources from the placement ring;

parsing the available resources from the placement ring;

determining whether all of the specified resources from the image are available within the placement ring based on the parsing of the available resources; and responsive to all of the specified resources from the image being not available within the placement ring, autoscaling the available resources based on the image to provide the placement ring with additional resources to satisfy the specified resources identified from the image.

11. The system of claim 9, wherein the template is immutable, and wherein the modifying the image comprises adding the writable layer on top of the image.

12. The system of claim 9, wherein obtaining the image further comprises:

identifying the image from a plurality of images based on the type of the first subservice or service;

the image is configured in line with image specifications to optimize deployment workflow and performance and/or security best practices to reduce vulnerability of the image; and the image specifications are selected based on the type of the first subservice or service and/or the security best practices are selected based on the type of the first subservice or service.

13. The system of claim 9, wherein the type of the first subservice or service is a machine-learned model software, software as a medical device, software operating in conjunction with a physical medical device, or data ingestion and processing software.

14. The system of claim 9, further comprising:

publishing, by the first kernel, the first subservice or service; and initiating, by the first kernel, security of the first subservice or service.

15. The system of claim 9, wherein the actions further comprise:

performing, by the first kernel, a health check to assess functionality of the first subservice or service and determine whether the first subservice or service is functioning as expected;

when the first subservice or service is fails the health check, notifying a continuous integration continuous deployment (CICD) system regarding the failure of the first subservice or service to function as expected, wherein the first request is received from the CICD system; and when the first subservice or service is functioning as expected, (i) publishing, by the first kernel, the first subservice or service, (ii) initiating, by the first kernel, the security of the first subservice or service, and (iii) notifying the CICD system regarding the success of the first subservice or service to function as expected.

16. The system of claim 9, wherein the actions further comprise:

receiving, at a second kernel residing on a second distributed computing environment, a second request to initiate a deployment process for a second subservice of the service on the second distributed computing environment, wherein the second subservice has a type, and in order for the second subservice or service to be deployed on the second distributed computing environment, the type of the second subservice or service has to be one that the second distributed computing environment is configured to support;

in response to receiving the request, provisioning, by the second kernel, specified resources within a placement ring of the second distributed computing environment, wherein the provisioning comprises:

obtaining an image based on the type of the second subservice or service, wherein the image is a template of a software package including a specification of resources used to execute the software package and the template is customized for using the specified resources based on the type of the second subservice or service;

locating the specified resources within the placement ring;

building, using the image, one or more containers encapsulating the specified resources, wherein the one or more containers are wrapped in a second pod for executing one or more programs to provide the second subservice or service; and modifying, using a writable layer, the image to include source code needed for executing the one or more programs; and deploying, by the second kernel, the second subservice or service using one or more replicas of the second pod and the modified image.

17. A computer-program product tangibly embodied in a non-transitory machine-readable storage medium, including instructions configured to cause one or more data processors to perform actions including:

receiving, at a kernel residing on a distributed computing environment, a request to initiate a deployment process for a subservice or service on the distributed computing environment, wherein the subservice or service has a type, and in order for the subservice or service to be deployed on the-distributed computing environment, the type of the subservice or service has to be one that the distributed computing environment is configured to support;

in response to receiving the request and the type of the subservice or service being one that the distributed computing environment is configured to support, provisioning, by the kernel, specified resources within a placement ring of the-distributed computing environment, wherein the placement ring comprises a pre-integrated and optimized combination of resources for the type of the subservice or service, and wherein the provisioning comprises:

obtaining an image based on the type of the subservice or service, wherein the image is a template of a software package including a specification of resources used to execute the software package and the template is customized for using the specified resources based on the type of the subservice or service;

locating the specified resources within the placement ring;

building, using the image, one or more containers encapsulating the specified resources, wherein the one or more containers are wrapped in a pod for executing one or more programs to provide the subservice or service; and modifying, using a writable layer, the image to include source code needed for executing the one or more programs;

deploying, by the kernel, the subservice or service using one or more replicas of the pod and the modified image; and executing, by the kernel, the subservice or service, wherein the executing comprises:

determining, by a master of the kernel, a framework for executing the subservice or service based on the type of the subservice or service;

offering, by the master of the kernel, available resources within the placement ring to the framework for executing the one or more programs to provide the subservice or service;

in response to the offer, receiving, by the master of the kernel, information about tasks defined by the one or more programs; and sending, by the master of the kernel, the tasks to an agent of the kernel, which allocates the specified resources to an executor of the framework for executing the tasks.

18. The computer-program product of claim 17, wherein the locating the resources comprises:

parsing the image to identify the specified resources;

requesting available resources from the placement ring;

parsing the available resources from the placement ring;

determining whether all of the specified resources from the image are available within the placement ring based on the parsing of the available resources; and responsive to all of the specified resources from the image being not available within the placement ring, autoscaling the available resources based on the image to provide the placement ring with additional resources to satisfy the specified resources identified from the image.

* * * * *